United States Patent
Gupta et al.

(10) Patent No.: US 10,196,086 B2
(45) Date of Patent: Feb. 5, 2019

(54) METHODS AND APPARATUS FOR ROBUST TRAJECTORY CONTROL OF AN AUTONOMOUS VEHICLE

(71) Applicant: GM GLOBAL TECHNOLOGY OPERATIONS LLC, Detroit, MI (US)

(72) Inventors: Pinaki Gupta, Novi, MI (US); Jin-Woo Lee, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 15/234,413

(22) Filed: Aug. 11, 2016

(65) Prior Publication Data
US 2018/0043931 A1    Feb. 15, 2018

(51) Int. Cl.
| | |
|---|---|
| B62D 6/00 | (2006.01) |
| B62D 5/04 | (2006.01) |
| B62D 11/00 | (2006.01) |
| B62D 11/02 | (2006.01) |
| G05B 15/02 | (2006.01) |
| G05D 1/02 | (2006.01) |
| B62D 7/15 | (2006.01) |
| B62D 9/00 | (2006.01) |
| G05D 1/00 | (2006.01) |

(52) U.S. Cl.
CPC .......... *B62D 6/005* (2013.01); *B62D 5/0457* (2013.01); *B62D 5/0481* (2013.01); *B62D 5/0484* (2013.01); *B62D 6/008* (2013.01); *B62D 7/159* (2013.01); *B62D 9/005* (2013.01); *B62D 11/003* (2013.01); *B62D 11/02* (2013.01); *G05B 15/02* (2013.01); *G05D 1/0055* (2013.01); *G05D 1/0212* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 6,052,647 | A * | 4/2000 | Parkinson | G01S 19/11 342/357.36 |
| 8,903,607 | B2 | 12/2014 | Lee et al. | |
| 9,045,118 | B2 * | 6/2015 | Taguchi | B60T 7/22 |
| 2017/0168485 | A1 * | 6/2017 | Berntorp | G01C 21/26 |

* cited by examiner

Primary Examiner — Tamara L Weber
(74) Attorney, Agent, or Firm — Lorenz & Kopf, LLP (57) ABSTRACT

A method for performing autonomous operation of a vehicle is provided. The method identifies, by at least one processor, an error condition of an electric power steering (EPS) device onboard the vehicle; obtains, by the at least one processor, input trajectory data for the autonomous operation of the vehicle; calculates, by the at least one processor, a feedforward rear steer angle, based on the input trajectory data; calculates, by the at least one processor, a feedback signal of the feedforward rear steer angle; calculates, by the at least one processor, a final steer angle command, using the feedforward rear steer angle and the feedback signal; and operates a steering mechanism of the vehicle using the final steer angle command, to autonomously maneuver the vehicle according to the final steer angle command.

15 Claims, 3 Drawing Sheets

METHODS AND APPARATUS FOR ROBUST TRAJECTORY CONTROL OF AN AUTONOMOUS VEHICLE

TECHNICAL FIELD

Embodiments of the subject matter described herein relate generally to vehicles, and more particularly, embodiments of the subject matter relate to trajectory control for autonomous vehicles.

BACKGROUND

An autonomous vehicle is a vehicle that is capable of sensing its environment and navigating with little or no user input. During an electric power steering failure, an autonomous vehicle will need to be controlled using a secondary steer mechanism. Due to the transient nature of the problem, the autonomous vehicle may need to be controlled at a higher lateral acceleration and/or through a rapidly changing longitudinal speed. In addition, the front steer may be moving due to a driver co-opting steer control, computational fluid dynamics (CFD) not holding the front steer, high road load, or the like. A robust controller with the capability to adjust for such dynamic variability may be required, to accommodate such circumstances.

Accordingly, it is desirable to provide techniques for improved control of steering for autonomous vehicles. In addition, it is desirable to provide methods, systems, and vehicles incorporating such techniques. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for performing autonomous operation of a vehicle. The method identifies, by at least one processor, an error condition of an electric power steering (EPS) device onboard the vehicle; obtains, by the at least one processor, input trajectory data for the autonomous operation of the vehicle; calculates, by the at least one processor, a feedforward rear steer angle, based on the input trajectory data; calculates, by the at least one processor, a feedback signal of the feedforward rear steer angle; calculates, by the at least one processor, a final steer angle command, using the feedforward rear steer angle and the feedback signal; and operates a steering mechanism of the vehicle using the final steer angle command, to autonomously maneuver the vehicle according to the final steer angle command.

Some embodiments provide a system for performing autonomous operation of a vehicle. The system includes a system memory element; a steering mechanism for the vehicle, the steering mechanism configured to autonomously maneuver the vehicle according to a final steer angle command; and at least one processor communicatively coupled to the system memory element, and the steering mechanism, the at least one processor configured to: identify an error condition of an electric power steering (EPS) device onboard the vehicle; obtain input trajectory data for the autonomous operation of the vehicle; calculate a feedforward rear steer angle, based on the input trajectory data; calculate a feedback signal of the feedforward rear steer angle; calculate the final steer angle command, using the feedforward rear steer angle and the feedback signal; and initiate operation of the steering mechanism using the final steer angle command.

Some embodiments provide a trajectory control system onboard a vehicle configured for autonomous operation. The trajectory control system includes a path planning controller, configured to: receive input trajectory data; and calculate a desired path for the vehicle, based on the input trajectory data, the desired path comprising curvature data, heading data, and lateral offset data; a quasi-feedforward path tracking controller communicatively coupled to the path planning controller, the quasi-feedforward path controller configured to: receive input values comprising the curvature data and front steer angle data; and compute a feedforward rear steer angle command, based on the input values; a model predictive control (MPC) feedback controller communicatively coupled to the path planning controller and the quasi-feedforward path tracking controller, the MPC feedback controller configured to: receive at least the feedforward rear steer angle command, a front steer angle, the desired path data, and vehicle sensor data; and calculate a final steer angle command, using at least the feedforward rear steer angle command, the front steer angle, the desired path data, and vehicle sensor data; and a steering mechanism for the vehicle, the steering mechanism communicatively coupled to the MPC feedback controller, the steering mechanism configured to: receive the final steer angle command from the MPC feedback controller; and maneuver the vehicle according to the final steer angle command.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for autonomously controlling a vehicle in the event of an electric power steering (EPS) failure. More specifically, the subject matter relates to calculating appropriate steering commands, and using the calculated steering commands to autonomously control a vehicle.

Certain terminologies are used with regard to the various embodiments of the present disclosure. An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from systems such as global positioning systems (GPS) to navigate. A steering mechanism is any device, hardware, or other instrument used to autonomously maneuver a vehicle according to a predetermined trajectory. The steering mechanism may be implemented using a rear steer mechanism, a front steer mechanism, a differential brake mechanism, or any other component or system operable to autonomously maneuver the vehicle.

Figure 1:
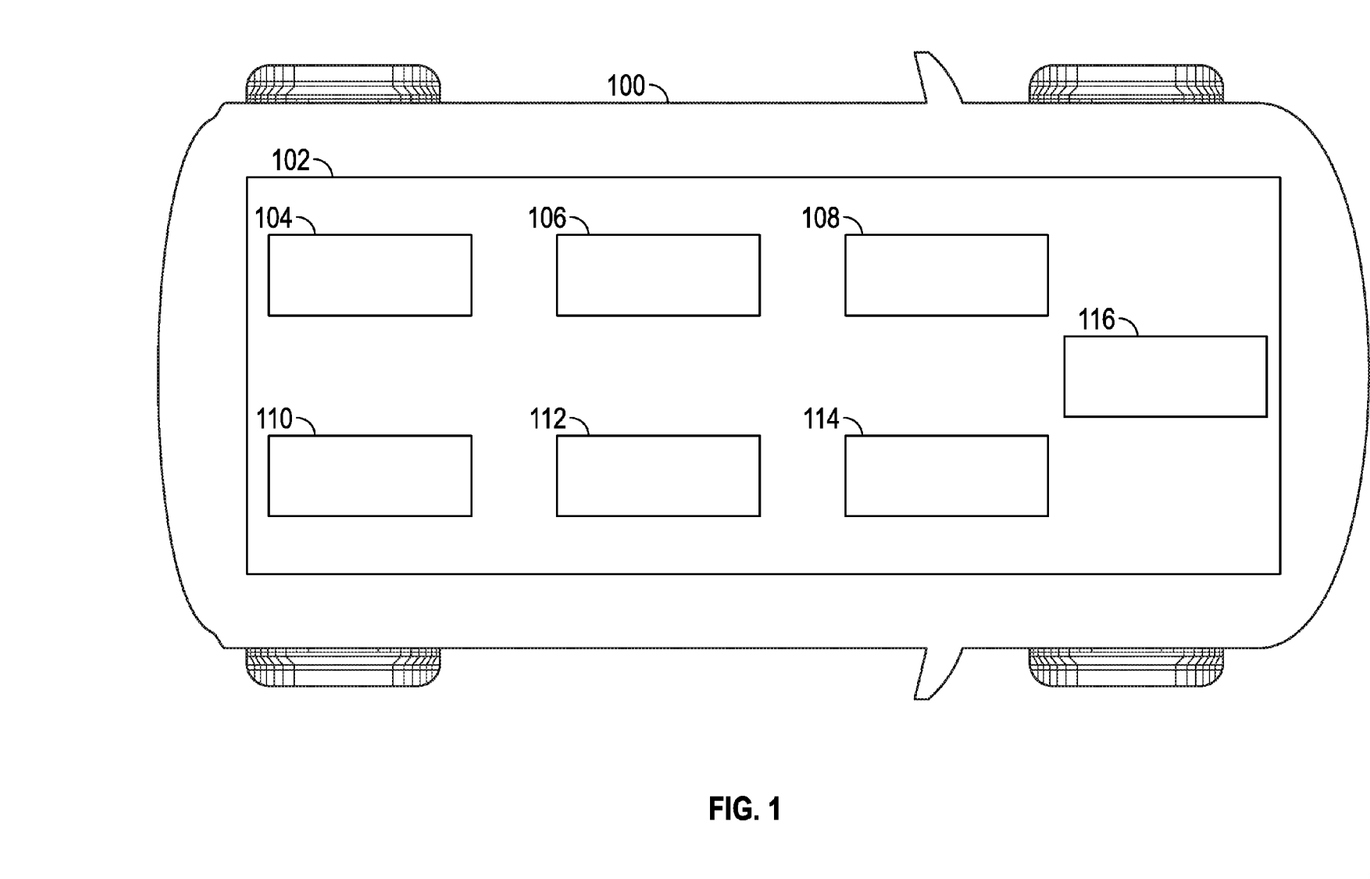
FIG. 1 is functional block diagram of an autonomous vehicle, including a control system for controlling steering of the autonomous vehicle, in accordance with the disclosed embodiments.

Turning now to the figures, FIG. 1 is functional block diagram of an autonomous vehicle 100, including a control system 102 for controlling steering of the autonomous vehicle 100, in accordance with the disclosed embodiments. The autonomous vehicle 100 may be any one of a number of different types of types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like.

The control system 102 may be implemented using any vehicle onboard computing system or platform. The control system 102 generally includes, without limitation: at least one processor 104; a system memory element 106; a navigation system 108; one or more cameras 110; a plurality of vehicle onboard sensors 112; a vehicle trajectory calculation module 114; and a steering mechanism 116. These elements and features of control system 102 may be operatively associated with one another, coupled to one another, or otherwise configured to cooperate with one another as needed to support the desired functionality—in particular, autonomous operation of the vehicle 100, as described herein. For ease of illustration and clarity, the various physical, electrical, and logical couplings and interconnections for these elements and features are not depicted in FIG. 1. Moreover, it should be appreciated that embodiments of the control system 102 will include other elements, modules, and features that cooperate to support the desired functionality. For simplicity, FIG. 1 only depicts certain elements that relate to the autonomous vehicle 100 operation techniques described in more detail below.

The at least one processor 104 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 104 may be realized as one or more microprocessors, controllers, microcontrollers, or state machines. Moreover, the at least one processor 104 may be implemented as a combination of computing devices, e.g., a combination of digital signal processors and microprocessors, a plurality of microprocessors, one or more microprocessors in conjunction with a digital signal processor core, or any other such configuration.

The at least one processor 104 communicates with a system memory element 106. The system memory element 106 may be realized using any number of devices, components, or modules, as appropriate to the embodiment. Moreover, the control system 102 could include a system memory element 106 integrated therein and/or a system memory element 106 operatively coupled thereto, as appropriate to the particular embodiment. In practice, the system memory element 106 could be realized as RAM memory, flash memory, EPROM memory, EEPROM memory, registers, a hard disk, a removable disk, or any other form of storage medium known in the art. In certain embodiments, the system memory element 106 includes a hard disk, which may also be used to support functions of the control system 102. The system memory element 106 can be coupled to the at least one processor 104 such that the at least one processor 104 can read information from, and write information to, the system memory element 106. In the alternative, the system memory element 106 may be integral to the at least one processor 104. As an example, the at least one processor 104 and the system memory element 106 may reside in a suitably designed application-specific integrated circuit (ASIC).

The navigation system 108 is deployed onboard the host vehicle 100. In practice, the navigation system 108 may be implemented as part of an onboard vehicle entertainment system, an onboard display system, an onboard vehicle instrumentation cluster, or the like. In one practical embodiment, the navigation system 108 is realized as, includes, or cooperates with an onboard global positioning system (GPS) that derives the current geographic position of the vehicle in real-time or substantially real-time. The navigation system 108 is configured to provide location data to the control system 102 of the vehicle 100. When the vehicle 100 is being driven, the navigation system 108 functions to periodically detect and/or measure a current location for the vehicle 100. The navigation system 108 may provide this location data to the control system 102 of the vehicle 100 via a data transmission. A current location for the vehicle 100 may be a triangulated position, a latitude/longitude position, x and y coordinates, or any other notation indicative of the geographic position of the vehicle 100.

In certain embodiments, the navigation system 108 is implemented as a GPS that includes a map module which stores the road curvature and rate of curvature change data. In this scenario, the navigation system 108 provides curvature data of the road ahead of the autonomous vehicle 100 when a GPS location is supplied to the map module.

The one or more cameras 110 are suitably configured to capture images outside of the vehicle 100, and this image data is used by the control system 102 to determine a predicted path of the vehicle and a theoretical path (i.e., a desired trajectory) for the vehicle 100, and to maintain positioning of the vehicle 100 inside lane markings on the road upon which the vehicle is traveling. Each of the one or more cameras 110 may have the ability to capture still frames and/or video images.

The one or more cameras 110 identify and report the left and right lane marking as two polynomials. The one or more cameras 110 also identify and report objects (e.g., other cars) within view of the one or more cameras 110. Once images are obtained by a camera, the images may be stored or transmitted.

The plurality of vehicle onboard sensors 112 may include velocity sensors, yaw rate sensors, radar sensors, inertial measurement sensors, front wheel angle sensors, rear wheel angle sensors, and any other sensor onboard the vehicle 100 which may be used to provide data associated with autonomous control of the vehicle 100. In some embodiments, Long Range Radar sensors (LRRs) and Short Range Radar sensors (SRRs) are used mainly to detect objects within sensor detection proximity to the autonomous vehicle 100.

The vehicle trajectory calculation module 114 is suitably configured to compute a "final" steering command appropriate to maneuver the vehicle 100 toward, and through, the theoretical path (i.e., the desired trajectory) in use by the vehicle 100. The vehicle trajectory calculation module 114 uses computed parameters, vehicle sensor data, lateral offset error data, and steer angle data, to compute the final steering command required to return the vehicle 100 to the desired trajectory. The final steering command may be applicable to a rear steering mechanism, a front steering mechanism, a brake differential mechanism, or any other type of steering mechanism 116 used to autonomously operate the vehicle 100 via the control system 102.

In exemplary embodiments of the control system 102, the vehicle trajectory calculation module 114 uses (i) lane marking data from the one or more cameras 110; (ii) curvature data obtained from the navigation system 108 (e.g., the GPS and map module); (iii) object data obtained from the one more cameras 110 and vehicle onboard sensors 112 (e.g., LRRs and SRRs), as part of a sensor fusion algorithm, to predict trajectory coordinates of an imaginary or theoretical center line for the current lane. The predicted trajectory coordinates are provided to downstream controllers as a polynomial $y=f(x)$, in the current vehicle coordinates.

In practice, the vehicle trajectory calculation module 114 may be implemented with (or cooperate with) the at least one processor 104 to perform at least some of the functions and operations described in more detail herein. In this regard, the vehicle trajectory calculation module 114 may be realized as suitably written processing logic, application program code, or the like.

The steering mechanism 116 is configured to autonomously maneuver the vehicle according to a final steer angle command, provided by the control system 102. The steering mechanism 116 may be implemented using a front steer mechanism, a rear steer mechanism, a differential brake mechanism, or any other instrumentation onboard the vehicle 100 operable to steer or maneuver the vehicle 100 as part of an autonomous function of the vehicle 100.

Figure 2:
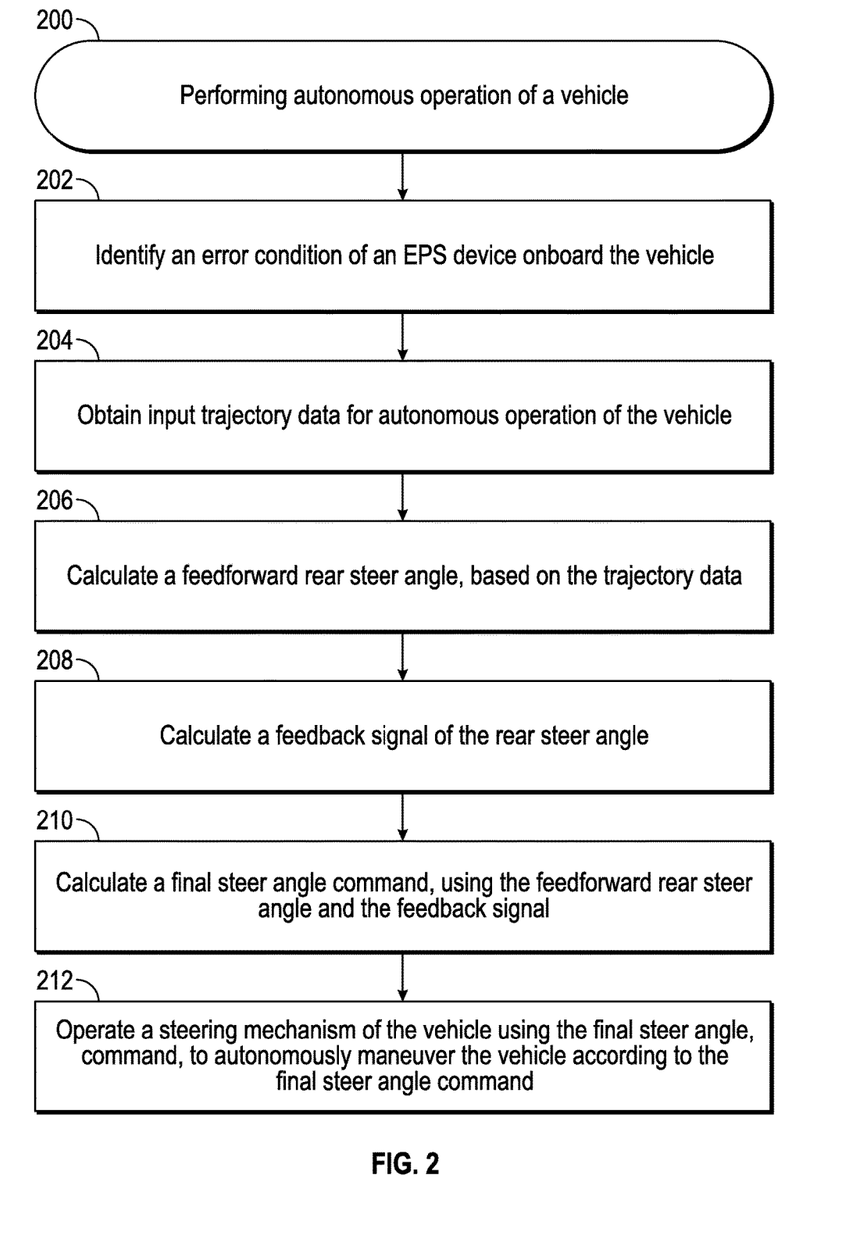
FIG. 2 is a flow chart that illustrates an embodiment of a process for performing autonomous operation of a vehicle.

FIG. 2 is a flow chart that illustrates an embodiment of a process 200 for performing autonomous operation of a vehicle. The various tasks performed in connection with process 200 may be performed by software, hardware, firmware, or any combination thereof. For illustrative purposes, the following description of process 200 may refer to elements mentioned above in connection with FIG. 1. In practice, portions of process 200 may be performed by different elements of the described system. It should be appreciated that process 200 may include any number of additional or alternative tasks, the tasks shown in FIG. 2 need not be performed in the illustrated order, and process 200 may be incorporated into a more comprehensive procedure or process having additional functionality not described in detail herein. Moreover, one or more of the tasks shown in FIG. 2 could be omitted from an embodiment of the process 200 as long as the intended overall functionality remains intact.

For ease of description and clarity, the process 200 is assumed to begin by identifying an error condition of an electric power steering (EPS) device onboard the vehicle (step 202). Generally, the vehicle is moving along a path or trajectory, when an error condition occurs, which diverts the vehicle to from the defined path and potentially results in an uncontrolled position for the vehicle. This creates an offset between the defined path and the actual vehicle position. In some embodiments, a front steering mechanism and/or a rear steering mechanism malfunctions, becomes locked at a particular angle, or encounters another error condition, rendering the front or rear steering mechanism non-functional for autonomous operation of the vehicle. In response to the error condition, and in order to accommodate a potentially higher lateral acceleration and a potentially rapidly changing longitudinal speed resulting from the error condition, steps 204-212 of the process 200 are triggered.

Next, the process 200 obtains input trajectory data for autonomous operation of the vehicle (step 204). The input trajectory data has been previously calculated, based on images of lane markings on the road captured by a vehicle onboard camera system. The input trajectory data includes a first path, between the lane markings, for the vehicle to travel.

The process 200 then calculates a feedforward rear steer angle, based on the input trajectory data (step 206). Here, the process 200 calculates a desired path (i.e., a theoretical trajectory) for the vehicle, which includes curvature data, heading data, and lateral offset data, based on the input trajectory data. The process 200 also obtains a longitudinal acceleration for the vehicle, and a front steer angle for the vehicle, and calculates the feedforward rear steer angle using the curvature data, a longitudinal acceleration, and a front steer angle.

Next, the process 200 calculates a feedback signal of the rear steer angle (step 208). The process 200 obtains vehicle sensor data comprising at least a lateral velocity of the vehicle and a yaw rate of the vehicle. The process 200 also calculates additional computed parameters, including at least the feedforward rear steer angle, the heading data, the lateral offset data, the front steer angle, a real-time cost function, and real-time state space matrices. The process 200 also calculates an integral state to accumulate a lateral offset error. At this point in the process 200, the front steer is locked. The process 200 then calculates the feedback signal using the vehicle sensor data, the computed parameters, and the lateral offset error.

During calculation of the feedback signal (step 208), the process 200 treats the feedforward rear steer commanded angle and the front steer actual angle as disturbances to the control architecture, and calculates the feedback signal of the feedforward rear steer angle using linear quadratic regulator (LQR) strategies and/or model predictive control (MPC) strategies, in response to the disturbances.

The process 200 then calculates a final steer angle command, using the feedforward rear steer commanded angle and the feedback signal (step 210). Here, the process 200 combines the feedforward rear steer angle and the feedback signal to produce the final steer angle command.

In one example, the process 200 is configured to command a differential brake in addition to the rear steer. The process 200 first calculates the brake command, and then the process 200 calculates the rear steering command using a current lateral offset value and then subtracting the effort received from the differential brake. After completing these steps, the process 200 transmits the rear steering command to the rear steer and the brake command to the differential brake. In the current process 200, the feedforward behaves in a manner similar to the differential brake, with the caveat that the feedforward is not a different actuator but is applied to the same rear steer actuator. Here, the process 200 adds the feedforward command to the total rear steer command. After calculating the final steer angle command, the process 200 operates a steering mechanism of the vehicle using the final steer angle command, to autonomously maneuver the vehicle according to the final steer angle command (step 212).

Figure 3:
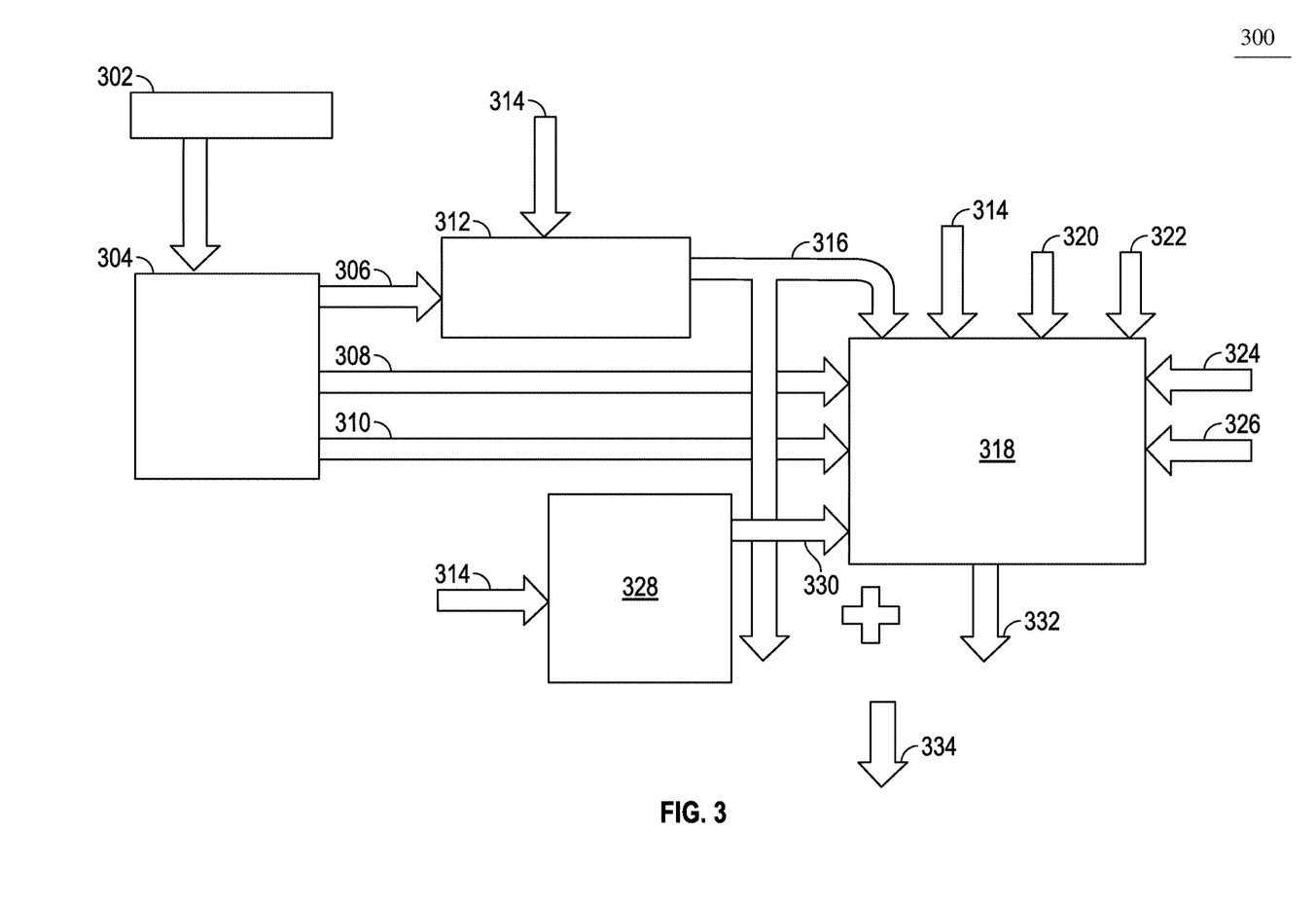
FIG. 3 is a flow diagram of an exemplary embodiment of a conceptual framework for the process of FIG. 2.

FIG. 3 is a flow diagram 300 of an exemplary embodiment of a conceptual framework for the process 200 of FIG. 2. It should be appreciated that FIG. 3 depicts a simplified embodiment of the process 200 of FIG. 2, and that some implementations of the flow diagram 300 may include additional elements or components. The flow diagram 300 includes various components of a control system for autonomously steering a vehicle, including without limitation: a path fusion controller 302, a path planning controller 304, a quasi-feedforward path tracking controller 312, a model predictive control (MPC) feedback path tracking controller 318, and a lateral offset error controller 328. Each of these controllers may be implemented onboard a vehicle using one or more onboard computing systems and/or electronic control units (ECUs).

The path fusion controller 302 is operable to determine a predicted path or trajectory for the vehicle, or to obtain the predicted trajectory data from an outside source. The path fusion controller 302 provides the predicted trajectory data to the path planning controller 304, and the path planning controller 304 then performs calculations to generate a desired path (i.e., theoretical trajectory). The desired path includes a plurality of (x, y) coordinates based on current coordinates of the vehicle, and obtained predicted path data. Output of the path planning controller 304 includes a desired curvature 306, a desired heading 308, and a desired lateral offset 310. The desired heading 308 includes the angle of the desired path, and the desired curvature 306 is a derivative of the desired heading 308.

The quasi-feedforward path tracking controller 312 receives input signals including the desired curvature 306 and a front steer angle 314. As described previously, the desired curvature 306 is calculated by the path planning controller 304. The front steer angle 314 may be obtained directly from a front steer angle sensor onboard the vehicle. The quasi-feedforward path tracking controller 312 generates an output signal that includes a feedforward rear steer angle command 316, using the desired curvature 306 and the front steer angle 314.

The quasi-feedforward path tracking controller 312 performs a feedforward calculation to determine a rear wheel steering angle (i.e., the feedforward rear steering angle command 316), using the following equation: $\delta_R = -(L*\rho + K*V^2*\rho) + \delta_F$, where $\rho$ is the desired path curvature 306, where $$\rho = \frac{y''}{(1+y'^2)^{3/2}},$$

where $\delta_R$ is the rear wheel steering angle, where L is the length of the vehicle, where V is the velocity of the vehicle, and where $\delta_F$ is the front wheel steering angle;

where $K = K_{us} + K_{us,SAT} + K_{us,LAT} + K_{us,LFCS}$, where K is the under steer coefficient, $K_{us,SAT}$ is an under steer coefficient for self-aligning torque, where $K_{us,LAT}$ is an under steer coefficient for lateral force transfer, and where $K_{us,LFCS}$ is an under steer coefficient for lateral force compliance steer;

where $$K_{us} = \frac{Mv*\left(B - a_x * \frac{H}{g}\right)}{\frac{L}{C_f}} - \frac{Mv*\left(A + a_x * \frac{H}{g}\right)}{L} \Big/ C_r,$$

where $$K_{us,SAT} = Mv*\left(\frac{p}{L}\right)*\left(\frac{1}{C_f} + \frac{1}{C_r}\right),$$

where p=the pneumatic trail;
where $$K_{us,LFCS} = Af * \frac{Mv*\left(B - a_x * \frac{H}{g}\right)}{\frac{L}{C_f}} - Ar * \frac{Mv*\left(A + a_x * \frac{H}{g}\right)}{L},$$

where $$K_{us,LAT} = 2\left(\frac{\rho H V^2}{W}\right)^2 * \left(\frac{Mv}{L}\right)^3 * \left[\left(B - a_x * \frac{H}{g}\right)^3 * \frac{b_f}{C_f^2} - \left(A + a_x * \frac{H}{g}\right)^3 * \frac{b_r}{C_r^2}\right].$$

Here, the under steer coefficient is represented as a function of the desired curvature 306, instead of the actual curvature. This is appropriate for the autonomous control command, eliminating the positive feedback loop that would otherwise be created using the understeer coefficient provided by vehicle dynamics.

The MPC feedback path tracking controller 318 receives input signals including the feedforward rear steer angle command 316, the desired heading 308, the desired lateral offset 310, the front steer angle 314, a real-time cost function 320, real-time state space matrices 322, vehicle sensor data that includes a lateral velocity 324 and a yaw rate 326, and lateral offset error data 330.

The real-time cost function 320 and the real-time state space matrices 322 are calculated using 2-DOF linearized bicycle model+2 DOF road offset and heading, using the following equations:

$x(k+1)=Ax(k)+Bu(k)+Fd(k)$ $z(k)=Cx(k)$ where $x=[\gamma \varphi \ v_y r]^T$, $u=\delta$, $A=e^{A_c \tau_s}$, $B=\int_0^{\tau_s} e^{A_c \alpha} B_c d\alpha$, $$C = \begin{bmatrix} 1 & 0 & 0 & 0 \\ 0 & 1 & 0 & 0 \end{bmatrix},$$

$$A_c = \begin{bmatrix} 0 & v_x & -1 & 0 \\ 0 & 0 & 0 & -1 \\ 0 & 0 & -\frac{C_f + C_r}{mv_x} & \frac{bC_r - aC_f}{mv_x} - v_x \\ 0 & 0 & \frac{bC_r - aC_f}{Iv_x} & -\frac{a^2 C_f + b^2 C_r}{Iv_x} \end{bmatrix},$$

$$B_c = \begin{bmatrix} 0 \\ 0 \\ 0 \\ \dfrac{C_f}{m} \\ \dfrac{aC_f}{I} \end{bmatrix},$$

where $v_x$ is longitudinal velocity in meters per second; where $v_y$ is lateral velocity in meters per second; where r is yaw rate in radians per second; where δ(t) is actual steering angle of the front road wheels in radians; where $\varphi_r(t)$ is yaw angle with respect to the road, in radians; where $\gamma_r(t)$ is lateral offset of the center of gravity of the vehicle from the lane, in meters; where a is distance from the center of gravity of the vehicle to the front axle, in meters; and where b is distance from the center of gravity of the vehicle to the rear axle, in meters. These calculations, and other calculations presented in the present disclosure, may be described in additional detail in Lee, et al., U.S. Pat. No. 8,903,607 B2, entitled "Lane Tracking System with Active Rear Steer, which is incorporated by reference herein.

The following equations are used to minimize the LQR cost:

$$J = \tilde{z}_N^T * Q_N * \tilde{z}_N + \Sigma_{k=0}^{N-1}[\tilde{z}^T(k)Q(k)\tilde{z}(k) + u^T(k)Ru(k)],$$

where $\tilde{z}(k) = \tilde{z}(k) - z_{des}(k)$, $Q_N \geq 0$, $Q \geq 0$, $R > 0$, and u is the steering angle command δ;

$$u(k) = -(B^T S(k+1)B + R)^{-1} B^T (v(k+1) - S(k+1)Ax(k))$$
$$= -K(k)x(k) + L(k)v(k+1) - L(k)S(k+1)Fd(k),$$

with the definition of the control gain matrices K(k) and L(k), $$L(k) = (B^T S(k+1)B + R)^{-1} B^T$$

$$K(k) = (B^T S(k+1)B + R)^{-1} B^T S(k+1)A,$$

the auxiliary sequence v(k):

$$v(k) = (A - BK(k))^T v(k+1) + C^T Q z_{des}(k),$$

$$-(A - BK(k))^T S(k+1)Fd(k),$$

$$v(N) = C^T Q_N z_{des}(N),$$

and the Riccati equation:

$$S(k) = A^T \left[ S(k+1) - S(k+1)B(B^T S(k+1)B + R)^{-1} B^T S(k+1) \right] A + C^T Q(k)C,$$

$$= A^T S(k+1)(A - BK(k)) + C^T Q(k)C,$$

$$S(N) = C^T Q(N)C.$$

To add learning ability to the MPC feedback path tracking controller 318, the original four DOF state space matrix is augmented with an integral state:

$$\begin{bmatrix} \dot{x} \\ \dot{x}_1 \end{bmatrix} = \begin{bmatrix} A_c & 0 \\ A_1 & 0 \end{bmatrix} \begin{bmatrix} x \\ x_1 \end{bmatrix} + \begin{bmatrix} B_c \\ 0 \end{bmatrix} u,$$

$$C = \begin{bmatrix} 1 & 0 & 0 & 0 & 0 \\ 0 & 1 & 0 & 0 & 0 \\ 0 & 0 & 0 & 0 & 1 \end{bmatrix},$$

$A_I = [1\ 0\ 0\ 0]$, or in other words, the error is integrated on the lateral offset only, since $x = [\gamma\ \varphi\ v_y\ r]^T$. Additionally, since the MPC feedback path tracking controller 318 is framed to optimize the future integral error, past integral error is added to the initial condition of the integral state.

Additionally, $x_i^{init} = \int_{-\infty}^{0} K_2(\text{subplus}(\Delta c_0)^*(|c_0| > K_3))dt$, where $\Delta c_0 = c_0(0) - c_0(-T)$, and where T is the sample time.

The K1, K2, K3 values are calibration thresholds.

As described above, $c_0$ is the difference in $c_0$ between a current time value and the last sample time value. The $c_0$ value is the lateral offset of the vehicle from the center line. The integral is from −infinity to t=0 (i.e., the current time). The integral is reset to zero when absolute value of $c_0$ is a small number, indicating that the vehicle is near the center line. Additionally, the integral is accumulated only when the absolute value of $c_0$ is greater than a threshold K3.

The lateral offset error controller 328 provides the MPC feedback path tracking controller 318 with the lateral offset error data 330. The lateral offset error controller 328 receives input signals including the front steer angle 314, and uses an integral state to accumulate lateral offset error data 330, which is then provided as an output signal to the MPC feedback path tracking controller 318.

The MPC feedback path tracking controller 318 produces an output signal including a feedback rear steer angle command (i.e., a feedback signal). The feedforward rear steer angle command 316 is then combined with the feedback rear steer angle command 332 to produce a "final" rear steer angle command, or in other words, a combined rear steer angle command 334. Although this exemplary embodiment of the flow diagram 300 generates a combined rear steer angle command 334 for use in controlling a rear steering mechanism for the vehicle, it should be appreciated that the flow diagram 300 may generate a front steer angle command, a differential brake operational command, or any other command appropriate to steering the vehicle.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "coupled" together. As used herein, unless expressly stated otherwise, "coupled" means that one element, node, or feature is directly or indirectly joined to (or directly or indirectly communicates with) another element, node, or feature, and not necessarily mechanically. Thus, although the schematics shown in FIGS. 1-2 depict exemplary arrangements of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices.

Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for performing autonomous operation of a vehicle, the method comprising:
   identifying, by at least one processor, an error condition of an electric power steering (EPS) device onboard the vehicle, the error condition rendering the EPS device non-functional for the autonomous operation of the vehicle and creating an offset between a defined path and an actual vehicle position; and
   in response to identifying the error condition,
      obtaining, by the at least one processor, input trajectory data for the autonomous operation of the vehicle, wherein the input trajectory data comprises the defined path for the vehicle to travel between lane markings on a road, the defined path being previously calculated based on images of lane markings captured by a vehicle onboard camera system;
      calculating, by the at least one processor, a feedforward rear steer angle, based on the input trajectory data, by:
         calculating a desired path using the input trajectory data, the desired path comprising a plurality of coordinates based on current coordinates of the vehicle and the defined path, and the desired path further comprising a desired path curvature, a desired path heading, and a desired path lateral offset;
         obtaining a longitudinal acceleration and a front steer angle for the vehicle, via one or more vehicle onboard sensors; and
         calculating the feedforward rear steer angle using the longitudinal acceleration, the front steer angle, and an understeer coefficient defined as a function of the desired path curvature;
      accumulating lateral offset error data for the front steer angle using an integral state, to generate accumulated lateral offset error data;
      calculating, by the at least one processor, a feedback signal of the feedforward rear steer angle, using input signals including the feedforward rear steer angle, the accumulated lateral offset error data, the front steer angle, the desired path heading, and the desired path lateral offset;
      combining a feedforward rear steer angle command and a feedback rear steer angle command to calculate, a final steer angle command, by the at least one processor, the feedforward rear steer angle command comprising the feedforward rear steer angle, and the feedback rear steer angle command comprising the feedback signal; and operating a steering mechanism of the vehicle using the final steer angle command, to autonomously maneuver the vehicle according to the final steer angle command.

2. The method of claim 1, further comprising:

obtaining, by the at least one processor, vehicle sensor data; and calculating the feedback signal using computed parameters and the vehicle sensor data.

3. The method of claim 2, wherein the computed parameters comprise at least the feedforward rear steer angle, the desired path heading, a desired path lateral offset, the front steer angle, a real-time cost function, and real-time state space matrices.

4. The method of claim 2, wherein the vehicle sensor data comprises at least a lateral velocity of the vehicle, and a yaw rate of the vehicle.

5. The method of claim 1, further comprising:

recognizing the feedforward rear steer angle and the front steer angle as disturbances to the autonomous operation of the vehicle; and calculating the feedback signal of the feedforward rear steer angle using linear quadratic regulator (LQR) strategies, in response to the disturbances.

6. The method of claim 1, further comprising:

recognizing the feedforward rear steer angle and the front steer angle as disturbances to the autonomous operation of the vehicle; and calculating the feedback signal of the feedforward rear steer angle using model predictive control (MPC) strategies, in response to the disturbances.

7. A system for performing autonomous operation of a vehicle, the system comprising:

a system memory element;

a steering mechanism for the vehicle, the steering mechanism configured to autonomously maneuver the vehicle according to a final steer angle command; and at least one processor communicatively coupled to the system memory element, and the steering mechanism, the at least one processor configured to:

identify an error condition of an electric power steering (EPS) device onboard the vehicle, the error condition rendering the EPS device non-functional for the autonomous operation of the vehicle and creating an offset between a defined path and an actual vehicle position; and in response to identifying the error condition, obtain input trajectory data for the autonomous operation of the vehicle, wherein the input trajectory data comprises the defined path for the vehicle to travel between lane markings on a road, the defined path being previously calculated based on images of lane markings captured by a vehicle onboard camera system;

calculate a feedforward rear steer angle, based on the input trajectory data, by:

calculating a desired path using the input trajectory data, the desired path comprising a plurality of coordinates based on current coordinates of the vehicle and the defined path, and the desired path further comprising a desired path curvature, a desired path heading, and a desired path lateral offset;

obtaining a longitudinal acceleration and a front steer angle for the vehicle, via one or more vehicle onboard sensors; and calculating the feedforward rear steer angle using the longitudinal acceleration, the front steer angle, and an understeer coefficient defined as a function of the desired path curvature;

accumulate lateral offset error data for the front steer angle using an integral state, to generate accumulated lateral offset error data;

calculate a feedback signal of the feedforward rear steer angle, using input signals including the feedforward rear steer angle, the accumulated lateral offset error data, the front steer angle, the desired path heading, and the desired path lateral offset;

combining a feedforward rear steer angle command and a feedback rear steer angle command to calculate the final steer angle command, the feedforward rear steer angle command comprising the feedforward rear steer angle, and the feedback rear steer angle command comprising the feedback signal; and initiate operation of the steering mechanism using the final steer angle command.

8. The system of claim 7, further comprising:

a plurality of vehicle sensors, configured to obtain vehicle sensor data comprising at least a lateral velocity of the vehicle and a yaw rate for the vehicle;

wherein the at least one processor is further configured to calculate the feedback signal using computed parameters and vehicle sensor data.

9. The system of claim 8, wherein the computed parameters comprise at least the feedforward rear steer angle, the desired path heading, the desired path lateral offset, the front steer angle, a real-time cost function, and real-time state space matrices.

10. The system of claim 7, wherein the steering mechanism comprises a rear wheel steering controller.

11. The system of claim 7, wherein the steering mechanism comprises a front wheel steering controller.

12. The system of claim 7, wherein the steering mechanism comprises a differential brake steering controller.

13. A trajectory control system onboard a vehicle configured for autonomous operation, the trajectory control system comprising:

at least one processor, configured to:

identify an error condition of an electric power steering (EPS) device onboard the vehicle, the error condition rendering the EPS device non-functional for the autonomous operation of the vehicle and creating an offset between a defined path and an actual vehicle position; and in response to identifying the error condition, initiate operation of a path planning controller, a quasi-feedforward path tracking controller, a lateral offset error path tracking controller, and a model predictive control (MPC) feedback controller;

the path planning controller, configured to:

receive input trajectory data, wherein the input trajectory data comprises the defined path for the vehicle to travel between lane markings on a road, the defined path being previously calculated based on images of lane markings captured by a vehicle onboard camera system; and calculate a desired path for the vehicle, based on the input trajectory data, the desired path comprising a plurality of coordinates based on current coordinates of the vehicle and the defined path, and the desired path comprising a desired path curvature, a desired path heading, and a desired path lateral offset;

the quasi-feedforward path tracking controller communicatively coupled to the path planning controller, the quasi-feedforward path controller configured to:
  receive input values comprising the desired path curvature, a front steer angle, and a longitudinal acceleration for the vehicle; and
  compute a feedforward rear steer angle command, based on the input values and an understeer coefficient defined as a function of the desired path curvature;

the lateral offset error controller, communicatively coupled to the MPC feedback controller, the lateral offset error controller configured to:
  integrate the front steer angle data to accumulate lateral offset error data, to generate accumulated lateral offset error data; and
  transmit the accumulated lateral offset error data to the MPC feedback path tracking controller;

the MPC feedback controller communicatively coupled to the path planning controller and the quasi-feedforward path tracking controller, the MPC feedback controller configured to:
  receive at least the feedforward rear steer angle command, the accumulated lateral offset error data, the front steer angle, the desired path heading, the desired path lateral offset, and vehicle sensor data; and
  calculate a feedback signal of the feedforward rear steer angle command, using at least the feedforward rear steer angle command, the accumulated lateral offset error data, the front steer angle, the desired path heading, the desired path lateral offset, and the vehicle sensor data;
  combine the feedforward rear steer angle command and a feedback rear steer angle command to calculate a final steer angle command, the feedback rear steer angle command comprising the feedback signal; and a steering mechanism for the vehicle, the steering mechanism communicatively coupled to the MPC feedback controller, the steering mechanism configured to:
  receive the final steer angle command from the MPC feedback controller; and
  maneuver the vehicle according to the final steer angle command.

14. The trajectory control system of claim 13, wherein the vehicle sensor data comprises at least a lateral velocity for the vehicle and a yaw rate for the vehicle.

15. The trajectory control system of claim 13, wherein the MPC feedback path tracking controller is further configured to:
  obtain real-time cost function data and real-time state space matrices associated with operation of the vehicle; and
  calculate the feedback rear steer angle command using the real-time cost function data and the real-time state space matrices.

* * * * *